United States Patent [19]
Goerz, Jr. et al.

[11] Patent Number: 5,472,769
[45] Date of Patent: Dec. 5, 1995

[54] SOFT BODY ARMOR MATERIAL WITH ENHANCED PUNCTURE RESISTANCE COMPRISING AT LEAST ONE CONTINUOUS FABRIC HAVING KNIT PORTIONS AND INTEGRALLY WOVEN HINGE PORTIONS

[75] Inventors: David J. Goerz, Jr., Menlo Park; Hugh R. Smith, Jr., San Mateo; Kenneth C. Miguel-Bettencourt, Oakland, all of Calif.

[73] Assignee: American Institute of Criminology International Corp., Oakland, Calif.

[21] Appl. No.: 165,277

[22] Filed: Dec. 10, 1993

[51] Int. Cl.⁶ .............................. F41H 1/02; B32B 3/10; B32B 7/00; B32B 5/06

[52] U.S. Cl. .................. 428/138; 2/2.5; 66/190; 428/172; 428/229; 428/236; 428/247; 428/253; 428/257; 428/299; 428/902; 428/911; 428/377; 428/398

[58] Field of Search ...................... 428/911, 102, 428/170, 229, 233, 234, 299, 300, 377, 902, 138, 236, 247, 257, 253, 398; 66/169 R, 196, 202, 190; 2/2.5

[56] References Cited

U.S. PATENT DOCUMENTS

| | | | |
|---|---|---|---|
| 4,404,889 | 9/1983 | Miguel | 428/911 |
| 4,443,506 | 4/1984 | Schmolmann et al. | 428/102 |
| 4,648,136 | 3/1987 | Higuchi | 428/911 |
| 4,737,402 | 4/1988 | Harpell et al. | 428/252 |
| 5,070,540 | 12/1991 | Bettcher et al. | 428/911 |
| 5,200,256 | 4/1993 | Dunbar | 428/212 |

*Primary Examiner*—James D. Withers
*Attorney, Agent, or Firm*—Schneck & McHugh

[57] ABSTRACT

A soft body armor material with enhanced puncture resistance is fabricated from knitted light weight, durable fibers, such as aramid fibers. The knitted portions are joined by interwoven portions providing an integrally formed hinge-like effect for flexibility. A deflection shield formed from a thin mesh of stainless steel or titanium wire or a sheet of light weight metal, such as titanium, with corrugations or dimples on the externally facing surface provides additional penetration resistance for sharp pointed objects. An inner resilient trauma shield and a removable moisture absorbing inner layer are also optionally included. Hollow fibers are employed in some of the layers to provide a ventilation or cooling capability, and fibers having an electrically resistive component can be employed in conjunction with a battery to provide resistance heating for warmth and moisture dissipation.

49 Claims, 4 Drawing Sheets

SOFT BODY ARMOR MATERIAL WITH ENHANCED PUNCTURE RESISTANCE COMPRISING AT LEAST ONE CONTINUOUS FABRIC HAVING KNIT PORTIONS AND INTEGRALLY WOVEN HINGE PORTIONS

BACKGROUND OF THE INVENTION

This invention relates to the field of soft armor material in general. More particularly, this invention relates to the field of soft armor material made of woven light weight fiber materials.

Soft armor material is known which is made from a plurality of fabric layers of light weight, high strength fibers, particularly aramid fibers, such as those sold under the trademark Kevlar. A typical soft armor material made from such fabric material is usually tailored in the form of a jacket or vest and is used to protect individuals against hand gun, shot gun, club and knife assaults. When soft armor material made of aramid fiber is struck by the bullet from a hand gun, the fibers absorb and disperse the impact energy from the struck fibers to other fibers in the weave of the fabric. The major energy transfer occurs at the cross-over points where the fibers are interwoven. Additional energy absorption is provided by arranging multiple layers in a direction parallel to the path of the bullet or bullet fragment. Such fabrics are typically designed to maximize the number of cross-over points, and thus the energy absorption. Since the woven fibers work together to dissipate the impact energy, a large area of the garment becomes involved in preventing penetration of the bullet therethrough. This energy dissipation reduces the severity of the shock (termed "blunt trauma") delivered to the body when the bullet or fragment is stopped. Additional protection against blunt trauma is provided in some soft body armor by the inclusion of a trauma shield layer in the interior of the soft body armor, the layer typically being fabricated from a resilient material such as plastic, foam or rubber.

While such conventional soft armor material can protect effectively against hand gun, shot gun, club and knife assaults, little protection is provided against sharp pointed knives or ice picks. This is due primarily to the woven design of the fabric which must permit lateral movement between fibers in order to provide the impact absorption energy characteristic. Since the fibers are free to move laterally in each layer, a sharp pointed instrument can readily penetrate through multiple layers and inflict life threatening wounds to the armor wearer. Efforts to provide soft body armor to defend against the threat of sharp pointed objects have typically centered around the use of relatively thick and expensive solid inner layers constructed of a strong, light weight metal such as titanium. Such devices, however, provided only limited protection unless fabricated to thicknesses which are unacceptably stiff and heavy so as to hamper the mobility of the wearer, in addition to being prohibitively expensive. Efforts to provide soft body armor having an acceptably light weight, relatively low cost, and the ability to shield against the threat of both bullets and narrow sharp pointed objects have not been successful to date.

SUMMARY OF THE INVENTION

The invention comprises a soft armor material which is capable of providing both energy absorption protection against impact and also protection against sharp pointed objects, which is relatively low in cost, and is light in weight.

In its broadest aspect, the invention comprises a soft armor material comprising a knitted light weight fabric providing a frictional resistance to the passage of a pointed object therethrough, the fabric being knitted preferably from a fiber selected from the group consisting of an aramid fiber and high strength fiber glass. The fabric is designed to be arranged in a plurality of layers attached together in some suitable fashion, such as stitching, thermal bonding, use of an adhesive or the like. The frictional resistance to the passage of a pointed object through the material is afforded by the knitted construction, which resists lateral displacement of the individual fibers in response to the application of the pointed end of an object in a manner somewhat analogous to the "Chinese finger pull" effect. The resistance of the material to penetration by a pointed object can be increased by including an additional fiber component wound about or interspersed with the main fiber component, the additional fiber component being selected from a group of relatively high strength and high surface friction flexible materials such as metal fibers and ceramic fibers. Also, portions of the knitted fabric can be strengthened by impregnation with plastic or epoxy materials.

The penetration resistance capability of the soft armor material fabricated according to the invention can be enhanced by the provision of an additional inner deflection layer. The additional deflection layer can be fabricated from finely woven flat or textured metal mesh fabricated from stainless steel or titanium wire, or a relatively thin sheet of high strength material, such as titanium, having a textured surface. The textured surface of either the mesh or the sheet material is preferably corrugated or dimpled. The surface corrugations or dimples function to deflect an entering sharp pointed instrument laterally of the intended penetration direction, which tends to disperse the penetrating force by causing a tearing action on the material. In applications not requiring this lateral deflection, the layer may comprise a thin, flexible sheet of polycarbonate material.

To provide additional flexibility to the material, which enhances the wearability of garments fabricated from the material, at least some of the material layers are provided with integrally woven fiber hinges for flexibly joining adjacent knitted sections. Further flexibility is afforded by interposing one or more layers of openly woven fibers between layers containing the knitted sections.

Additional utility to the material is afforded by fabricating at least some portions of at least one of the plurality of layers from hollow fibers capable of conducting a cooling or ventilating fluid therethrough. Where such hollow fibers are employed, the protective garment can be provided with an auxiliary pack of cooling fluid or a ventilating fluid source, the pack including pumping means for providing fluid flow through the hollow fibers. Alternatively, hollow solid or braided tubes may be interspersed within the material layers, or a plastic screen-like matrix can be used to afford ventilation and cooling.

Additional utility can also be provided by incorporating an electrically conductive component into at least some portions of at least one of the plurality of layers to enable resistive heating of a garment fabricated from the material. In such applications, a suitable source of electric power, such as a small battery pack, can be optionally provided to provide the current flow required for the resistive heating effect.

Additional utility to garments fabricated from the material can be afforded by the inclusion of a conventional trauma shield fabricated from plastic, foam or rubber in the interior of the garment fabricated from the soft body armor material.

Further utility for the invention can be afforded by providing a removable moisture absorbent layer in the interior of garments fabricated from the soft body armor material.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
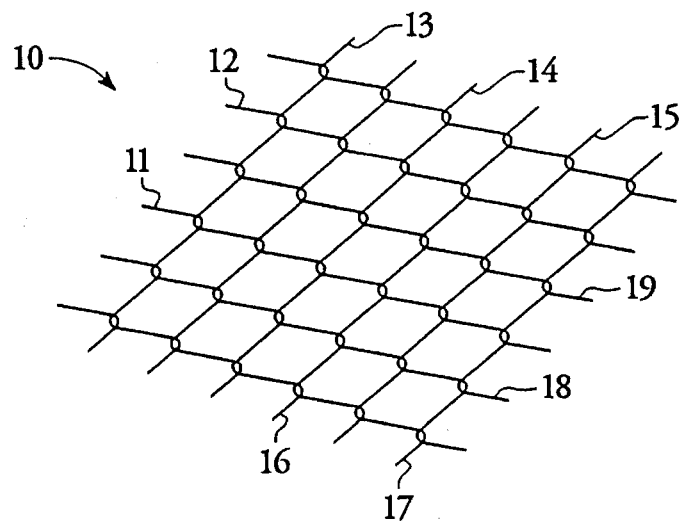
FIG. 1 is a schematic illustration of a single layer of material illustrating the invention.

Turning now to the drawings, FIG. 1 is an illustrative view of a portion of a single layer of fabric 10 suitable for use in a multiple layer protective body armor garment according to the invention. As seen in this FIG., light weight, durable fibers 11–15 are knitted to similar fibers 16–19 in a random knitted arrangement so as to resist lateral motion therebetween when a pointed object contacts the layer of material. The fibers 11–19 are preferably made from aramid, such as the aramid sold under the trademark Kevlar. Such fibers produce a fabric which is extremely light in weight, highly durable with great strength resistance. The size of the fiber diameters and the random knitted pattern may be selected in accordance with the requirements of any given application. The knitting is preferably accomplished by means of a computer controlled knitting machine.

Figure 2:
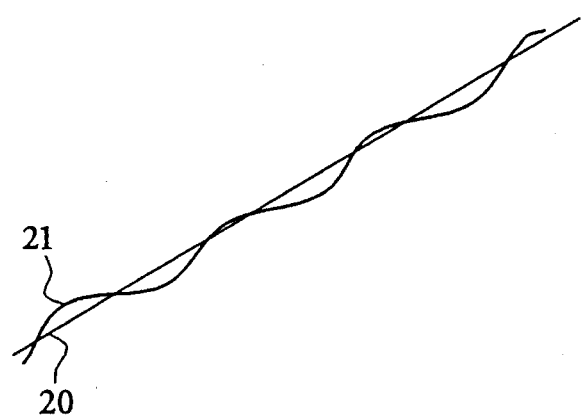
FIG. 2 is a schematic illustration of a single strand of fiber illustrating the use of additional friction fiber.

As shown in FIG. 2, in order to increase frictional resistance of the fabric made from the individual fibers, an additional higher friction, high strength supplemental fiber 21 can be wound about an aramid fiber 20 and used as the compound knitting fiber to produce the fabric layer illustrated in FIG. 1. Alternatively, supplemental fiber 21 may be simply interwoven with the knitted fabric 20. In addition, individual fibers 11–19 may be supplemented with braided strands of pure aramid or aramid and high friction fibers to provide a more three-dimensional layer 10.

Figure 3:
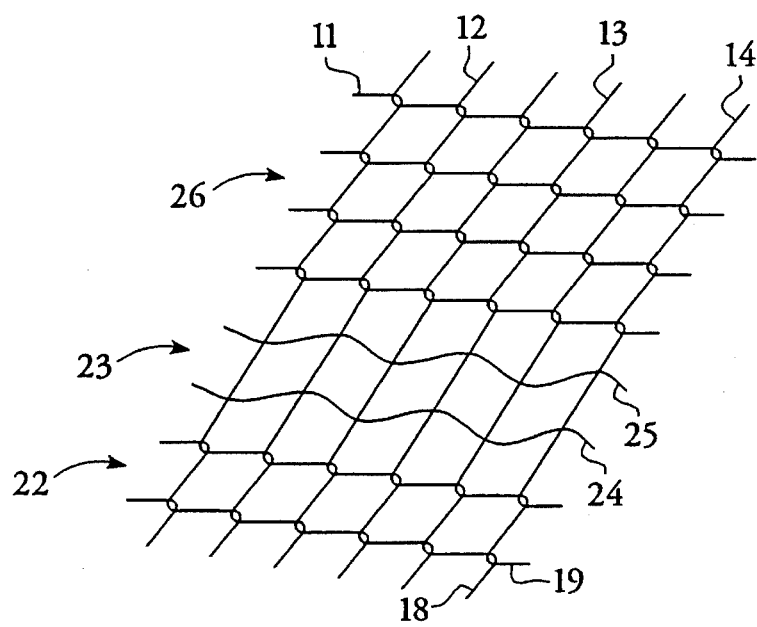
FIG. 3 is a schematic illustration of a single layer of material incorporating integrally woven hinges for flexibility.

With reference to FIG. 3, the knitted fabric layer exhibits a relatively rigid characteristic when assembled together in a plurality of layers as described below. To provide flexibility within each given layer, interstitial portions such as portion 23 are provided in which the individual fibers are interwoven as illustrated for fibers 24, 25 and 11–15 in between the knitted major portions designated with reference numerals 22, 26. The pattern and spacing of the woven sections 23 can best be selected on an empirical basis, depending on the use to which the individual layers will be put. Thus, the interstitial woven sections 23 may be in the form of small rectangular portions, row portions, column portions and the like.

Figure 4:
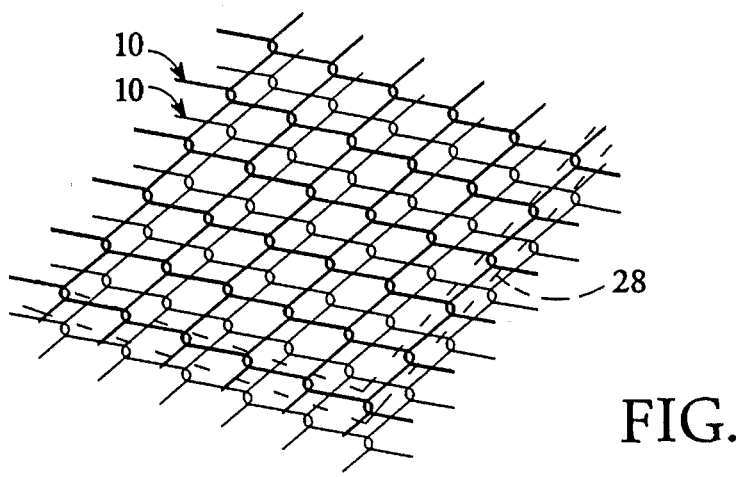
FIG. 4 is a schematic illustration of several layers of fabric material secured together to form a multi-layer fabric.

As best seen in FIG. 4, individual layers 10 of the knitted/woven material are secured together in order to provide a multi-layer fabric. The method of attaching individual layers 10 together is conventional, and may include adhesive bonding, thermal bonding, fabric stitching or any other technique presently used in the art. The phantom lines 28 illustrated in FIG. 4 illustrate one rectilinear pattern for the attaching seams.

As will now be understood, the multi-layer fabric can be used to fabricate soft body armor in any desired configuration, such as a jacket, vest, sleeves, leggings, pant or the like using conventional fabric patterning techniques known in the art. The garment so fabricated retains the impact absorbing characteristics of the prior art woven fiber fabric and, in addition, possesses the enhanced capability of high resistance to the penetration of a sharp pointed object. Successive layers of the knitted material produce a "Chinese finger pull" effect on the shaft of a sharp pointed instrument entering the fabric layers. The open weave "hinge" sections 23 of FIG. 3 provide the energy absorption effect found in known soft armor materials used to stop bullets and bullet fragments. The energy absorption effect of multiple layer soft armor made according to the invention can be adjusted by adding more layers of open weave material, or by establishing open weave zones in knitted layers and arranging the multiple layers with knitted zones of one layer entirely or partially overlapping the adjacent layer open weave zone. Further, the anti-penetration characteristics of the invention can be enhanced by impregnating portions or entire knitted layers with an epoxy or plastic material to fill the voids between the knits. Since this tends to stiffen the layer, additional hinge sections 23 may be advisable to afford the desired degree of flexibility. The anti-penetration capability of the invention can also be enhanced by the use of a deflection layer such as those illustrated in FIGS. 5–8.

Figure 5:
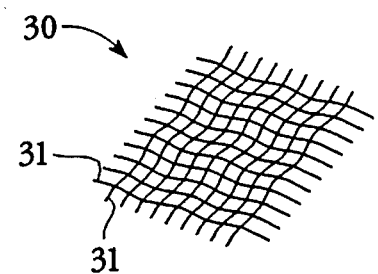
FIG. 5 is a schematic view of a first embodiment of a deflection layer.

With reference to FIG. 5, one form of such a deflection layer comprises a fine wire mesh 30 with individual strands 31 fabricated from a high strength metal wire such as stainless steel wire or titanium wire. The mesh size can vary, but a preferred size is one in the range of about 200 mesh. Also, the mesh may be substantially flat, as illustrated, or textured in the manner described below.

Figure 6:
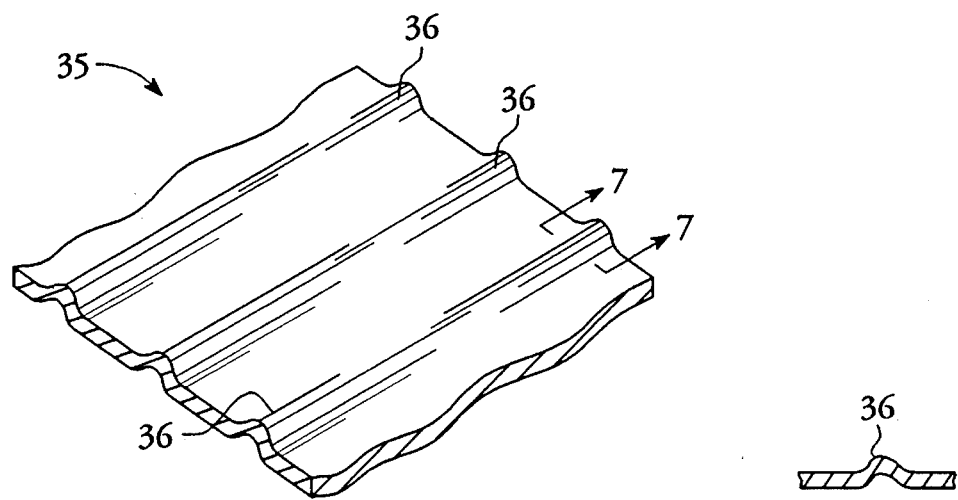
FIG. 6 is a schematic view of a second embodiment of a deflection layer.
Figure 7:
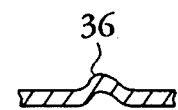
FIG. 7 is an enlarged sectional view taken along lines 7—7 of FIG. 6.
Figure 8:
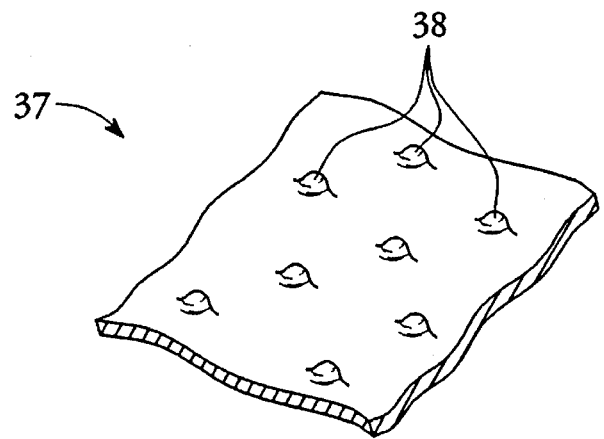
FIG. 8 is a schematic view of another embodiment of a deflection layer.

FIGS. 6 and 7 illustrate another form for the deflection shield generally designated with reference numeral 35 and consisting of a corrugated thin sheet of light weight metal, such as titanium or other high strength metals capable of being stamped or rolled into shape, the corrugations being designated with reference numeral 36. An alternate embodiment of the metal sheet deflection shield is illustrated in FIG. 8 in which the sheet 37 is provided with a plurality of dimpled projections 38. In the embodiments of FIGS. 6–8, the shield is preferably fabricated from a metal plate having a thickness in the range from about 0.020 to about 0.030 inch. The corrugations 36 and projections 38 may be in the height range of about 0.125 to about 0.250 inch. The deflection shields 30, 35, 37 can be mounted adjacent the innermost layer 10 of the multi-layer fabric, or can be mounted within the assembled multi-layer fabric between adjacent layers 10.

Figure 9:
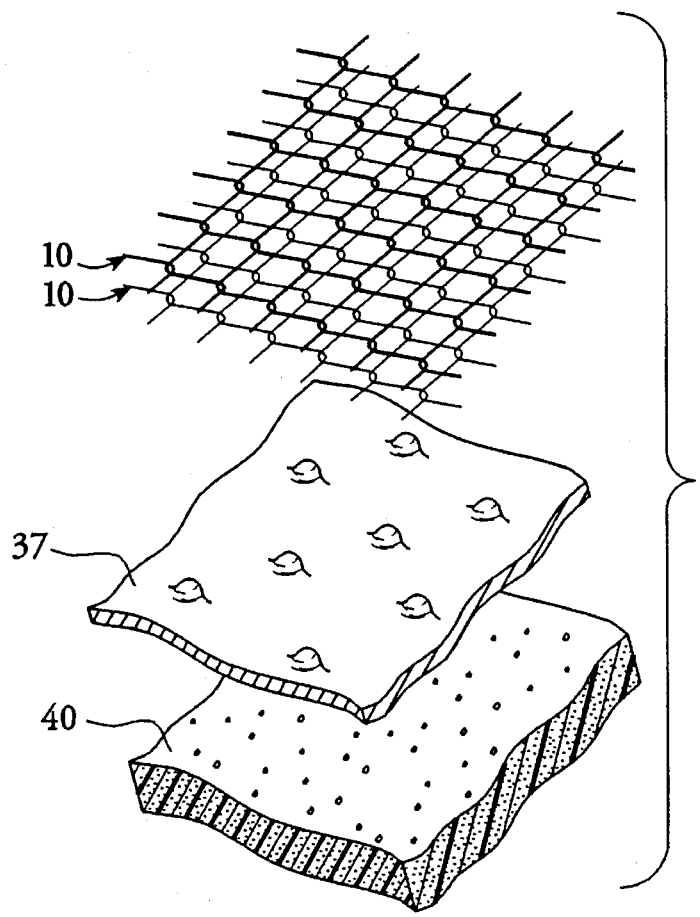
FIG. 9 is an exploded schematic view illustrating the combination of the fabric material, deflection layer and a resilient shield layer.

FIG. 9 illustrates an assembly consisting of a multi-layer fabric of panels 10, a deflection shield 37 and a trauma shield 40 fabricated from a resilient material, such as plastic, rubber or the foam illustrated in the figure.

Figure 10:
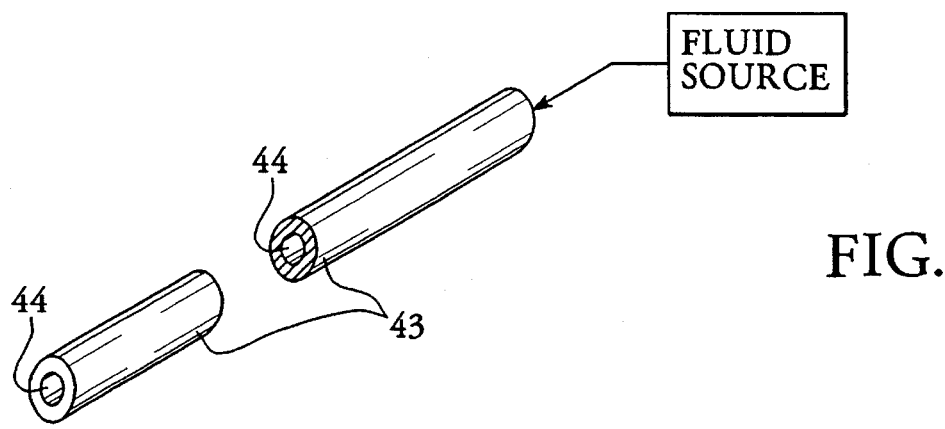
FIG. 10 is a schematic view of a hollow fiber.

Garments fabricated from the multi-layer fabric tend to be effective thermal insulators, due to the nature of the fiber, the close spacings between adjacent fibers, the impregnation material (where used) and the knitted nature of the fabric. This thermal insulative efficiency is enhanced with the use of a trauma shield 40. In some applications, it may be desirable to provide some means for ventilating the garment. FIG. 10 illustrates a preferred technique for accomplishing either ventilation or cooling (or both). As seen in FIG. 10, the individual fibers such as fiber 43 have a hollow core 44 permitting the passage of a cooling or ventilation fluid therethrough. By fabricating at least portions of at least one of the layers 10 from such hollow fibers, ventilation or cooling (or both) can be provided to the garment by coupling the hollow interior 44 to a source of a cooling or ventilating fluid. For example, a small cooling pack with a battery powered pump or fan can be incorporated into the garment fabricated from the flexible material, with the outlet of the pump/fan coupled by a suitable manifold to individual conduits 44 within the fibers 43. In place of hollow fibers 43, hollow flexible plastic tubes or braided tubes (not shown) can be inserted between fabric layers 10 and coupled to the ventilation or cooling fluid source. Alternatively or additionally, an apertured matrix of polycarbonate material such as that sold under the trademark Lexan may be used to provide air space within the multi-layered fabric. It is also noted that the textured deflection shields described above also provide some degree of ventilation by virtue of the spacing action provided by the dimpled projections or corrugations.

Figure 11:
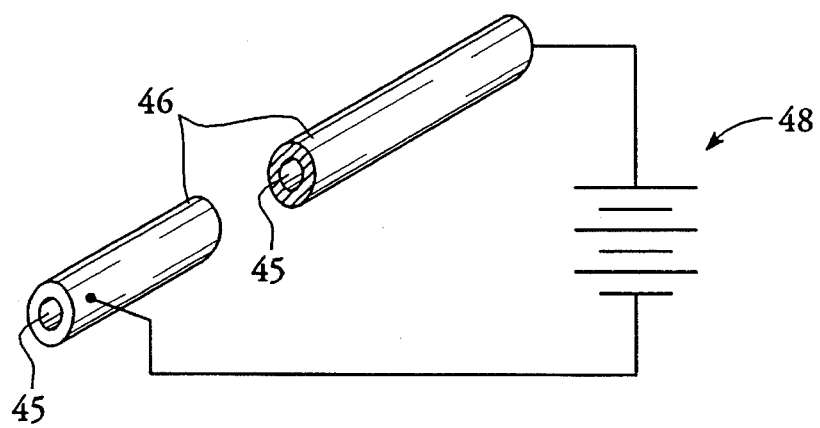
FIG. 11 is a schematic view of a fiber with an electrically resistive component.

Similarly, in some applications it may be desirable to provide a heating function for the garment. One reason for providing a heating function is to reduce the moisture content of the fabric. This is desirable due to the characteristic of aramid fiber of exhibiting reduced frictional resistance with increased moisture content. Another purpose in providing a heating function is to provide comfort to the wearer in cold climate applications. A preferred technique for providing the heating function is illustrated in FIG. 11. As seen in this FIG., individual fibers 45 are provided with a resistive component (such as carbon) either as an outside layer 46 as illustrated or as an integrally intermixed component of the fiber itself. The resistive component has the characteristic of generating heat in response to the passage of electric current therethrough. As suggested in FIG. 11, the individual fibers 45 are coupled electrically to a source of electrical power, such as battery 48, which may be incorporated into the garment or placed in the pocket of the garment or the like. Alternatively, fibers 45 may be coupled to a suitable plug designed to be inserted in a vehicle cigar light socket.

Figure 12:
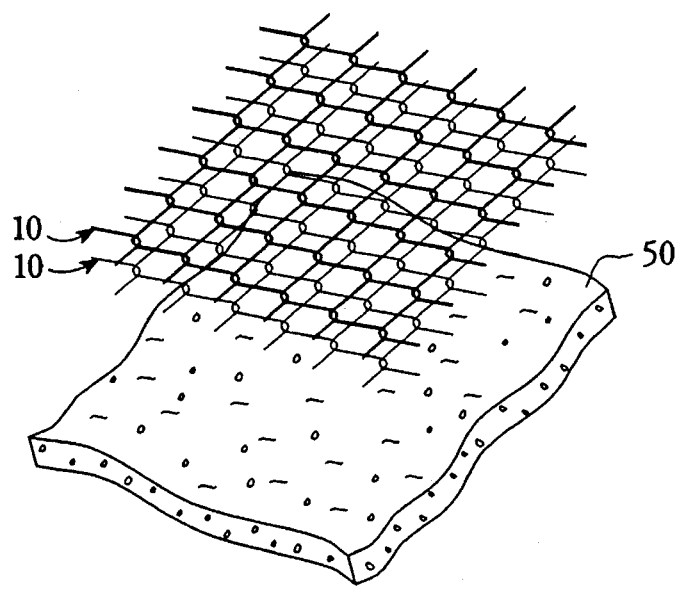
FIG. 12 is a view illustrating the use of a removable moisture absorbent layer with the material.

It has also been observed that, in stressful situations, there may be a need for a moisture or perspiration absorbing inner layer for a garment fabricated from the multi-layer material. As shown in FIG. 12, such a layer can be releasably adhered to the inner layer of fabric 10, with the moisture absorbing layer 50 being fabricated from a light weight, porous material of any suitable design. The layer 50 can be attached by means of a suitable adhesive, such as that used in available disposable diaper products today.

As will now be apparent, the invention provides an improved soft armor fabric which affords not only the impact energy absorbing characteristics of known soft armor fabrics but also provides resistance to the intrusion of sharp pointed objects through the garment and into the body of the wearer. This additional functional capability is provided without any substantial increase in cost for the fabric and without any substantial increase in the weight of the garment made with the fabric. In addition, the use of the flexible hinge woven portions integrally formed within the fabric reduces the rigidity of garments fabricated according to the invention. Also, the fabric is entirely compatible with the metal deflection shields for enhanced anti-penetration capability and with the usual resilient trauma shield. Also, the use of the hollow fibers for ventilation and/or cooling, as well as the use of resistive fibers or resistive component fibers, provides enhanced adaptability for garments fabricated with the materials of the invention.

While the above provides a full and complete disclosure of the preferred embodiments of the invention, various modifications, alternate constructions and equivalents may be employed without departing from the spirit of the invention. For example, thin plastic sheets of Lexan or other thin flexible sheet plastic materials of a durable nature may be inserted in between the layers 10 of the knitted fabric for additional protection. Also, while the material has been specified described with reference to body armor applications, the material may also be used in many other applications requiring a light weight protective layer. Examples of such applications are use as a flexible cowling around unprotected areas of armored vehicles (e.g. tank turrets) and use as a protective skin for aircraft (e.g. floor of a combat helicopter). Moreover, other fibers than aramid fibers can be used to fabricate the material, such as high strength fiberglass fibers (E-glass). Therefore, the above descriptions and illustrations should not be construed as limiting the scope of the invention, which is defined by the appended claims.

What is claimed is:

1. A soft armor material for resistance to bullets and sharp points comprising:
   (a) a plurality of knitted fiber layers forming a first face of the armor material, at least one of the layers being a continuous fabric including:
      (i) knitted portions having a density which provides substantial frictional resistance to sharp points, and
      (ii) integrally woven hinge portions providing flexibility and energy absorption between adjacent knitted portions, and
   (b) a deflection layer for enhanced penetration resistance, the deflection layer being substantially impermeable to sharp points.

2. The armor material of claim 1 wherein the deflection layer is interposed between successive knitted fiber layers.

3. The armor material of claim 1 further comprising a trauma shield forming a second face of the armor material for reducing impact shock, the second face being proximate to an object to be protected and the first face being proximate to a strike surface.

4. The armor material of claim 3 wherein the trauma shield is fabricated from a material selected from the group consisting of plastic, foam, and rubber.

5. The armor material of claim 3 wherein the deflection layer is disposed between the knitted fiber layers and the trauma shield.

6. The armor material of claim 1 wherein the knitted fiber layers comprise a fiber composition selected from the group consisting of aramid fibers and high strength fiberglass.

7. The armor material of claim 1 wherein the knitted fiber layers include a main fiber component and an additional fiber component having a surface friction greater than the main fiber component.

8. The armor material of claim 7 wherein the additional fiber component is selected from the group consisting of metal fibers and ceramic fibers.

9. The armor material of claim 7 wherein the additional fiber component is wound about the main fiber component.

10. The armor material of claim 7 wherein the additional fiber component is interspersed with the main fiber component.

11. The armor material of claim 1 wherein at least some of the woven hinge portions of different knitted fiber layers are arranged to overlap.

12. The armor material of claim 1 wherein the deflection layer comprises a finely woven metal mesh.

13. The armor material of claim 12 wherein the metal mesh is fabricated from a material selected from the group consisting of stainless steel wire and titanium wire.

14. The armor material of claim 12 wherein the metal mesh is substantially flat.

15. The armor material of claim 12 wherein the metal mesh is textured.

16. The armor material of claim 1 wherein the deflection layer comprises a thin sheet of high strength material.

17. The armor material of claim 16 wherein the high strength material comprises polycarbonate.

18. The armor material of claim 16 wherein the high strength material comprises titanium.

19. The armor material of claim 16 wherein the deflection layer includes corrugations.

20. The armor material of claim 16 wherein the deflection layer includes dimpled projections.

21. The armor material of claim 1 wherein at least some of the knitted portions of the knitted fiber layers are impregnated with a material selected from the group consisting of epoxy resin and thermoplastic materials.

22. The armor material of claim 1 wherein at least some portion of the knitted fiber layers is fabricated from hollow fibers capable of conducting a fluid therethrough to provide cooling or ventilation.

23. The armor material of claim 1 wherein at least some portion of the knitted fiber layers includes an electrically conductive component capable of providing resistive heating.

24. The armor material of claim 1 further comprising a removable moisture absorbent layer positioned away from the first face of the armor material.

25. The armor material of claim 1 further comprising a ventilation spacer element interspersed within the knitted fiber layers.

26. The armor material of claim 25 wherein the ventilation spacer element comprises an apertured matrix of flexible material.

27. The armor material of claim 25 wherein the ventilation spacer element comprises a plurality of hollow tubes.

28. The armor material of claim 27 wherein the hollow tubes are braided.

29. A bullet and sharp point resistant armor material for garments, the armor material comprising:

(a) a layer of knit panels, the panels having substantially rigid knitted portions and at least one of the panels including a continuous fabric having substantially flexible woven portions between adjacent knitted portions, the density of the knit construction sufficient to substantially retard pointed objects, and (b) a deflection layer, substantially impermeable to pointed objects.

30. The armor material of claim 29 wherein the deflection layer is positioned between successive knit panels.

31. The armor material of claim 29 wherein the deflection layer is positioned adjacent to the layer of knit panels.

32. The armor material of claim 29 wherein the knit panels are comprised of fibers selected from the group consisting of aramid fibers and high strength fiberglass.

33. The armor material of claim 29 wherein the knit panels are comprised of a main fiber component and an additional fiber component having a greater surface friction than the main fiber component.

34. The armor material of claim 33 wherein the additional fiber component is selected from the group consisting of metal fibers and ceramic fibers.

35. The armor material of claim 29 wherein at least a portion of the knit panels is impregnated with a material selected from the group consisting of epoxy resin and thermoplastic materials.

36. The armor material of claim 29 wherein the woven portions of different knit panels are positioned to overlap.

37. The armor material of claim 29 wherein the deflection layer is a finely woven mesh fabricated from wire selected from the group consisting of stainless steel wire and titanium wire.

38. The armor material of claim 29 wherein the deflection layer is a sheet of polycarbonate.

39. The armor material of claim 29 wherein the deflection layer is a sheet of metal having a textured surface.

40. The armor material of claim 39 wherein the metal comprises titanium.

41. The armor material of claim 39 wherein the textured surface is of a pattern selected from the group consisting of corrugations and dimpled projections.

42. The armor material of claim 29 further comprising a resilient trauma shield.

43. The armor material of claim 29 further comprising a moisture absorbent shield.

44. The armor material of claim 29 further comprising a cooling or ventilation mechanism selected from the group consisting of (i) a plurality of hollow tubes interspersed within the knit panels, (ii) a plurality of braided hollow tubes interspersed within the knit panels, (iii) an apertured flexible matrix layer positioned within the knit panels, and (iv) a plurality of hollow fibers capable of conducting a fluid therethrough, the hollow fibers providing an additional fiber component for fabrication of the knit panels.

45. The armor material of claim 29 further comprising an electrically conductive component in the layer of knit panels for resistive heating.

46. In a bullet and sharp point resistant garment, a fabric providing frictional resistance, energy absorption, and flexibility, the fabric comprising:

a plurality of fiber panels having substantially rigid knitted portions and at least one of the panels including a continuous fabric having substantially flexible woven portions between adjacent knitted portions of the panels, the fiber component of the panels including aramid fibers and one of the group consisting of metal fibers and ceramic fibers, the panels layered in an overlapping manner and joined.

47. The fabric of claim 46 further comprising a lateral deflection layer with textured formations.

48. The fabric of claim 47 wherein the lateral deflection layer includes titanium.

49. The fabric of claim 47 wherein the lateral deflection layer is in the range of 0.020 to 0.030 inch thick with textured formations in the range of 0.125 to 0.250 inch high.

* * * * *